US010851016B1

(12) United States Patent
Geal, III et al.

(10) Patent No.: US 10,851,016 B1
(45) Date of Patent: *Dec. 1, 2020

(54) TRONA ACCELERATED COMPOSITIONS, AND METHODS OF UTILIZING AND PRODUCING THE SAME

(71) Applicant: J&P Invesco LLC, Schertz, TX (US)

(72) Inventors: George Clarence Geal, III, Parker, CO (US); Stanley R. Peters, Castle Rock, CO (US)

(73) Assignee: J&P Invesco LLC, Schertz, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/907,550

(22) Filed: Feb. 28, 2018

Related U.S. Application Data

(60) Provisional application No. 62/464,826, filed on Feb. 28, 2017.

(51) Int. Cl.
| | |
|---|---|
| *C04B 7/02* | (2006.01) |
| *C04B 18/12* | (2006.01) |
| *C04B 22/00* | (2006.01) |
| *C04B 22/10* | (2006.01) |
| *C04B 103/12* | (2006.01) |
| *C04B 111/00* | (2006.01) |

(52) U.S. Cl.
CPC ............... *C04B 7/02* (2013.01); *C04B 18/12* (2013.01); *C04B 22/002* (2013.01); *C04B 22/106* (2013.01); *C04B 2103/12* (2013.01); *C04B 2111/0075* (2013.01); *C04B 2201/52* (2013.01)

(58) Field of Classification Search
CPC ......... C04B 7/02; C04B 18/12; C04B 22/002; C04B 22/106; C04B 2103/12; C04B 2111/0075; C04B 2201/52
See application file for complete search history.

(56) References Cited

U.S. PATENT DOCUMENTS

| | | |
|---|---|---|
| 1,782,471 A | 11/1930 | Kirchener |
| 1,968,152 A | 7/1934 | Kirchener |
| 2,307,485 A | 1/1943 | Booth |
| 2,434,301 A | 1/1948 | Wertz |
| 2,600,018 A | 6/1952 | Nelson et al. |
| 2,806,531 A | 9/1957 | Morgan et al. |
| 2,819,171 A | 1/1958 | Benedict et al. |
| 2,820,713 A | 1/1958 | Wagner |
| 2,890,965 A | 6/1959 | Underdown et al. |
| 3,008,843 A | 11/1961 | Jolly |
| 3,427,175 A | 2/1969 | Angstadt et al. |
| 4,032,353 A * | 6/1977 | Ball .................. C04B 28/02 106/725 |
| 4,042,408 A | 8/1977 | Murray et al. |
| 4,209,336 A | 6/1980 | Previte |
| 4,264,367 A | 4/1981 | Schutz |
| 4,444,593 A | 4/1984 | Schutz |
| 5,106,422 A | 4/1992 | Bennett et al. |
| 5,211,751 A | 5/1993 | Arfaei et al. |
| 5,728,209 A * | 3/1998 | Bury .................. C04B 40/0633 106/638 |
| 5,785,751 A | 7/1998 | Bashlykov et al. |
| 6,485,561 B1 | 11/2002 | Dattel |
| 6,648,962 B2 | 11/2003 | Berke et al. |
| 6,869,474 B2 | 3/2005 | Perez-pena et al. |
| 6,913,645 B2 * | 7/2005 | McNulty, Jr. ........... C04B 28/00 106/638 |
| 7,029,527 B2 | 4/2006 | Gaudry et al. |
| 7,427,321 B2 | 9/2008 | Hilton et al. |
| 7,670,427 B2 | 3/2010 | Perez-pena et al. |
| 7,842,348 B2 | 11/2010 | Abbott et al. |
| 8,167,998 B2 | 5/2012 | Ladely et al. |
| 8,747,547 B1 | 6/2014 | Peters et al. |
| 8,822,567 B2 | 9/2014 | Kono et al. |
| 9,028,606 B2 | 5/2015 | Andersen |
| 9,038,719 B2 | 5/2015 | Crews |
| 9,090,508 B2 | 7/2015 | Gong |
| 10,239,790 B2 | 3/2019 | Byrd |
| 10,322,971 B1 * | 6/2019 | Geal, III ............... C04B 22/106 |
| 10,571,045 B2 | 2/2020 | Pino, Jr. et al. |
| 10,571,047 B2 | 2/2020 | Pino, Jr. et al. |
| 10,641,414 B2 | 5/2020 | Pino, Jr. et al. |
| 2002/0117088 A1 | 8/2002 | Norman et al. |

(Continued)

FOREIGN PATENT DOCUMENTS

| | | |
|---|---|---|
| BE | 508098 A1 | 1/1952 |
| BE | 582948 A1 | 1/1960 |

(Continued)

OTHER PUBLICATIONS

Reddy, V. Venkateswara, et al., "Influence of Strong Alkaline Substances (Sodium Carbonate and Sodium Bicarbonate) in Mixing Water on Strength and Setting Properties of Concrete," Indian Journal of Engineering & Materials Sciences, vol. 13, Apr. 2006, pp. 123-128.

Bost et al., "Comparison of the accelerating effect of various additions on the early hydration of Portland cement," Construction and Building Materials, Jun. 15, 2016, 2 pages.

Juenger et al., "A soft X-ray microscope investigation into the effects of calcium chloride on tricalcium silicate hydration," Cement and Concrete Research, Jun. 1, 2005, 2 pages.

Kosmatka et al., "Design and Control of Concrete Mixtures," The guide to applications, methods, and materials, 15th edition, Engineering Bulletin 001, Portal Cement Association, 2011, p. 91.

Odler et al., "On the combined effect of water solubles lignosulfonates and carbonates on Portland cement and clinker pastes 1. Physical properties," Cement and Concreate Research, Jul. 1, 1978, 2 pages.

Rapp, "Effect of Calcium Chloride on Portland Cements and Concretes," Journal of Research of the National Bureau of Standars, Apr. 1, 1935, 2 pages.

(Continued)

Primary Examiner — Anthony J Green

(57) ABSTRACT

Trona-accelerated composition for backfilling trenches are described. The compositions consist of aggregate (e.g., sand), Portland cement, Trona, water and sometimes air. The compositions may have a compressive strength of between 10 psi and 100 psi after 4 hours, a compressive strength of between 75 psi and 500 psi after 28 days, and a penetration resistance of between 4.5 tsf and 200 tsf after 4 hours. Also disclosed are methods of filling a trench with fast-setting flowable fill.

20 Claims, No Drawings

(56) References Cited

U.S. PATENT DOCUMENTS

| | | |
|---|---|---|
| 2003/0041785 A1 | 3/2003 | Harrison |
| 2005/0103234 A1* | 5/2005 | McNulty, Jr. ............ C04B 28/00 106/712 |
| 2008/0227891 A1 | 9/2008 | Jarvie et al. |
| 2009/0114126 A1 | 5/2009 | Roddy et al. |
| 2009/0158960 A1 | 6/2009 | Andersen |
| 2009/0158965 A1 | 6/2009 | Andersen |
| 2009/0158967 A1 | 6/2009 | Andersen |
| 2010/0064943 A1 | 3/2010 | Guevara et al. |
| 2010/0095871 A1 | 4/2010 | Patil et al. |
| 2011/0021668 A1 | 1/2011 | Hamai et al. |
| 2012/0037046 A1 | 2/2012 | La Rolland et al. |
| 2012/0040165 A1 | 2/2012 | Dubey |
| 2012/0196046 A1 | 8/2012 | Nicoleau |
| 2013/0008354 A1* | 1/2013 | Constantz ............... C04B 14/26 106/801 |
| 2013/0087075 A1* | 4/2013 | Massa ..................... C04B 28/18 106/672 |
| 2014/0083698 A1 | 3/2014 | Stone et al. |
| 2014/0138007 A1 | 5/2014 | Dubey et al. |
| 2014/0311387 A1 | 10/2014 | Hohn et al. |
| 2015/0175887 A1 | 6/2015 | Welker |
| 2015/0240163 A1 | 8/2015 | Welker |
| 2015/0291476 A1 | 10/2015 | Al-Mutlaq |
| 2018/0106015 A1 | 4/2018 | Pino et al. |
| 2018/0156357 A1 | 6/2018 | Pino et al. |
| 2020/0149659 A1 | 5/2020 | Pino, Jr. et al. |
| 2020/0149660 A1 | 5/2020 | Pino, Jr. et al. |
| 2020/0200292 A1 | 6/2020 | Pino, Jr. et al. |

FOREIGN PATENT DOCUMENTS

| | | |
|---|---|---|
| CA | 412214 A | 5/1943 |
| CA | 419133 A | 3/1944 |
| CA | 419134 A | 3/1944 |
| CA | 419135 A | 3/1944 |
| CA | 462493 A | 1/1950 |
| CA | 520832 A | 1/1956 |
| CA | 566361 A | 11/1958 |
| CA | 607361 A | 10/1960 |
| CA | 607391 A | 10/1960 |
| CA | 625024 A | 8/1961 |
| CA | 713618 A | 7/1965 |
| CA | 900635 A | 5/1972 |
| CA | 1204456 | 5/1986 |
| CN | 101670619 A | 3/2010 |
| DE | 1807608 A1 | 6/1970 |
| EP | 114448 A1 | 8/1984 |
| EP | 127960 A1 | 12/1984 |
| EP | 402306 A1 | 12/1990 |
| EP | 2520553 A1 | 11/2012 |
| EP | 1532080 B1 | 3/2014 |
| EP | 2832706 A1 | 2/2015 |
| EP | 2414301 B1 | 11/2015 |
| FR | 38549 E | 6/1931 |
| FR | 1591415 A | 4/1970 |
| FR | 2061507 A2 | 6/1971 |
| GB | 301509 A | 1/1930 |
| GB | 430781 A | 6/1935 |
| GB | 791622 A | 3/1958 |
| GB | 833071 A | 4/1960 |
| GB | 1181331 A | 2/1970 |
| GB | 1315225 A | 5/1973 |
| IN | 154852 A1 | 12/1984 |
| IN | 159750 A1 | 6/1987 |
| JP | 06040756 A | 2/1994 |
| JP | 06298552 A | 10/1994 |
| JP | 1996029963 B2 | 3/1996 |
| JP | 2802972 B2 | 9/1998 |
| JP | 11217253 A | 8/1999 |
| JP | 2000007402 A | 1/2000 |
| JP | 2000095554 A | 4/2000 |
| JP | 3125316 B2 | 1/2001 |
| JP | 2004002080 A | 1/2004 |
| JP | 3558730 B2 | 8/2004 |
| JP | 2005324982 A | 11/2005 |
| JP | 2006298661 A | 11/2006 |
| JP | 4157485 B2 | 10/2008 |
| JP | 4290628 B2 | 7/2009 |
| JP | 4348001 B2 | 10/2009 |
| JP | 2010150105 A | 7/2010 |
| JP | 4626541 B2 | 2/2011 |
| JP | 4705455 B2 | 6/2011 |
| JP | 4725742 B2 | 7/2011 |
| JP | 4813822 B2 | 11/2011 |
| JP | 4837161 B2 | 12/2011 |
| JP | 4860396 B2 | 1/2012 |
| JP | 4877886 B2 | 2/2012 |
| JP | 5051990 B2 | 10/2012 |
| JP | 5113496 B2 | 1/2013 |
| JP | 2013170436 | 9/2013 |
| JP | 2013077378 A1 | 4/2015 |
| JP | 2015124141 A | 7/2015 |
| JP | 2015229684 A | 12/2015 |
| KR | 100311286 B1 | 9/2001 |
| KR | 1020120016432 A | 2/2012 |
| LU | 57288 | 2/1969 |
| RU | 2099302 C1 | 12/1997 |
| RU | 2102356 C1 | 1/1998 |
| RU | 2119900 C1 | 10/1998 |
| RU | 2186942 C1 | 8/2002 |
| RU | 2257294 C1 | 7/2005 |
| RU | 2337124 C1 | 10/2008 |
| RU | 2434923 C1 | 11/2011 |
| RU | 2470979 C1 | 12/2012 |
| RU | 2497861 C1 | 11/2013 |
| RU | 2525408 C1 | 8/2014 |
| RU | 2542063 C1 | 2/2015 |
| RU | 2545208 C1 | 3/2015 |
| RU | 2553807 C1 | 6/2015 |
| RU | 2555683 C1 | 7/2015 |
| SU | 848594 A1 | 7/1981 |
| SU | 876960 A1 | 10/1981 |
| SU | 1411439 A1 | 7/1988 |
| SU | 1435762 A1 | 11/1988 |
| SU | 1585309 A1 | 8/1990 |
| SU | 1682531 A1 | 10/1991 |
| WO | 8601795 A1 | 3/1986 |
| WO | 0051947 A1 | 9/2000 |
| WO | 2008130107 A1 | 10/2008 |
| WO | 2010047919 A1 | 4/2010 |
| WO | 2011139466 A1 | 11/2011 |
| WO | 2012136963 A1 | 10/2012 |
| WO | 2014068409 A2 | 5/2014 |
| WO | 2014072533 A1 | 5/2014 |
| WO | 2015034531 A1 | 3/2015 |
| WO | 2015034543 A1 | 3/2015 |
| WO | 2015130284 A1 | 9/2015 |
| WO | 2016043500 A1 | 3/2016 |

OTHER PUBLICATIONS

Rosenberg, "Study of the Mechanism Through Which Calcium Chloride Accelerates the Set of Portland," Oct. 1, 1964, 2 pages.
Williams et al., "Developing Mixture Proportion Guidance for Field-Prepared Rapid-Setting Materials for Emergency Airfield Repairs," Feb. 8, 2012, 2 pages.
Witlbank et al., "Effect of Selected Accelerants on the Physical Properties of Mineral Trioxide Aggregate and Portland Cement," Journal of Endodontics, Oct. 1, 2007, 2 pages.
Chryso, Material Safety Data Sheet, Chryso Plast P150, Revision Date: Jun. 26, 2009, 5 pages.
Rapid Set Cement, Fast Setting Hydraulic Cement, Manufacturer: CTS Cement Manufacturing Corp., 1982, 1 page.
BCSA is a stand-alone rapid-setting Cement, PP composition, 2018, Eupave, 1 page.
Safety Data Sheet, Rapid Set, CTS cement, Version No. 2, revision date Issue date Jan. 27, 2018, pp. 1-7.
Western Material & Design, LC, FasTrac 400, vol. Mar. 2018, 2 pages.

(56) References Cited

OTHER PUBLICATIONS

Chryso Turbocast NCT, concrete admixture, Safety Data Sheet, according to Federal Register, vol. 77, No. 58, Monday, Mar. 26, 2012, pp. 1-5.
Surecrete Design Products, Inc., Safety Data Sheet, TruTique—Integral Color (Gun Metal), revision date Jan. 1, 2017, 7 pages.
Liquid Calcium chloride, Product Data Sheet, Tetra Chemicals, 2004, 1 page.
Fibercast, by Propex, Product Data, Fibercast 500, PCS-1156E-002 (Mar. 2017), 2 pages.
ARG Roving Specification, Nippon Electric Glass Co., Ltd, Kanzaki, Shiga, Japan, Feb. 5, 2001, version 2, 1 page.

\* cited by examiner

TRONA ACCELERATED COMPOSITIONS, AND METHODS OF UTILIZING AND PRODUCING THE SAME

RELATED APPLICATIONS

This application claims priority to U.S. Provisional Patent Application Ser. No. 62/464,826, filed Feb. 28, 2017, which is fully incorporated herein by reference.

INTRODUCTION

Traditional Portland cement Controlled Low Strength Materials (CLSM) can take 8 to 12, even up to 24 hours before suitable for pavement repairs but demands of construction and opening roadways to traffic have accelerated in recent years. Contractors are pressured to backfill a construction trench and cover the backfill with an asphalt patch in much less time than traditional CLSM allows.

The problem with accelerating the set time of backfill CLSM compositions (e.g., using accelerators to decrease the set time of cement) in order to meet the reduced-time demands of modern construction is that the use of accelerants to decrease set times leads to compositions that have an increased final compressive strength. Increased compressive strengths are unfavorable for future excavation. Traditional Portland-cement based CLSMs as defined by the American Concrete Institute (ACI) 229 defines CLSMs as materials having compressive strength of 1200 psi or less, and suggests 300 pounds per square inch (psi) as the upper limit of compressive strength to permit easier excavation at a later date. The upper limit of 1200 psi allows for the use of this material in applications where future excavation is unlikely, such as structural fill under buildings. Entities that are responsible for maintaining the utilities in the backfilled trenches often times prefer 100-200 psi for ease of later excavation.

The present disclosure generally relates to accelerating the set-times of Portland cement and aggregate mixtures by using Trona as an accelerant (or additional accelerants) to produce a fast-setting flowable fill for rapid utility trench filling in streets and roadways. Trona, also known as trisodium hydrogendicarbonate dihydrate or sodium sesquicarbonate dehydrate, is a non-marine evaporite mineral that is mined as raw ore. Trona is cheaper and surprisingly more effective than sodium carbonate or sodium bicarbonate at accelerating set times of disclosed compositions while maintaining low final compressive strengths. The disclosed compositions also exhibit a reduced final compressive strength of the composition after setting and thereby allow for easy excavation at a later date.

SUMMARY

The present disclosure identifies Trona accelerated compositions for decreasing set times comprising between 60% and 90% aggregate (e.g., sand) by weight of the composition, between 3% and 25% Portland cement by weight of the composition, between 0.25% and 8% Trona by weight of the composition, and between 8% and 35% water by weight of the composition. The composition may have a set time of less than 1 hour, a compressive strength of between 10 psi and 100 psi after 4 hours, and a compressive strength of between 75 psi and 500 psi after 28 days. The composition may have a penetration resistance of between 4.5 tsf and 200 tsf after 4 hours.

The present disclosure also identifies accelerated compositions for decreasing set times comprising between 10% and 50% aggregate (e.g., dry inert powders) by weight of the composition, between 30% and 70% Portland cement by weight of the composition, between 4% and 40% accelerant (e.g., Trona, sodium bicarbonate, sodium carbonate) by weight of the composition, between 25% and 50% water by weight of the composition, and between 10% and 70% air by volume of the composition. The composition may have a set time of less than 1 hour, a compressive strength of between 10 psi and 100 psi after 4 hours, and a compressive strength of between 75 psi and 1800 psi after 28 days. The composition may have a penetration resistance of between 0.5 tsf and 4.5 tsf after 4 hours.

The aggregate in some disclosed compositions may be sand, fine aggregate, coarse aggregate, micro aggregate (e.g., Bag House Fines), recycled trench spoils, screened native soils, recycled materials or some combination thereof. In an exemplary embodiment the aggregate is sand. In some disclosed compositions the accelerant is Trona. In certain disclosed compositions a water reducer, e.g., Chryso® P150 or other water reducer standard in the industry, between 9 and 18 fluid ounces per cubic yard of the composition is included. In certain disclosed compositions a polymer, e.g., hydroxypropyl methylcellulose, between 0.05% and 0.12% by weight of dry solids is included in the composition.

The present disclosure also identifies a method of backfilling a trench comprising excavating the trench, mixing a composition of the present disclosure using aggregate or sand excavated from the trench (recycled spoils), and filling the trench with a composition of the present disclosure that includes aggregate or sand excavated from the trench (recycled spoils).

While the disclosure will be described with respect to preferred embodiment configurations and with respect to particular compositions or methods used therein, it will be understood that the disclosure is not to be construed as limited in any manner by either such configuration or components described herein. Also, while the particular types of equipment, compositions and uses are described herein, it will be understood that such particular compositions, equipment or uses are not to be construed in a limiting manner. Instead, the functionality of those compositions and methods should be appreciated. These and other variations of the disclosure will become apparent to those skilled in the art upon a more detailed description of the disclosure.

The advantages and features which characterize the disclosure are pointed out with particularity in the claims annexed hereto and forming a part hereof. For a better understanding of the disclosure, however, reference should be had to the examples, which form a part hereof and to the accompanying descriptive matter, in which there is illustrated and described embodiments of the disclosure. The provisional applications to which this application claims priority are incorporated herein in their entirety.

DETAILED DESCRIPTION

The present disclosure reveals a fast-setting flowable fill composition, generating higher early strengths yet still sufficiently low ultimate strengths. In a first embodiment, the present disclosure achieves these goals using Trona as an accelerant in combination with Portland cement and sand, and in some embodiments air. In a second embodiment, the present disclosure achieves these goals using Trona, sodium bicarbonate, and/or sodium carbonate as an accelerant in combination with cement, aggregate, and air.

A first embodiment of the present disclosure includes a composition for decreasing set times comprising or consisting essentially of between 60% and 90% aggregate (e.g., sand) by weight of the composition, between 3% and 25% Portland cement by weight of the composition, between 0.25% and 8% Trona by weight of the composition, and between 8% and 35% water by weight of the composition. The composition may have a set time of less than 1 hour, a compressive strength of between 10 psi and 100 psi after 4 hours, and a compressive strength of between 75 psi and 500 psi after 28 days. The composition may have a penetration resistance of between 4.5 tsf and 200 tsf after 4 hours.

An exemplary example of a first embodiment of the present disclosure includes a composition for decreasing set times comprising sand between 65% and 85% by weight of the composition, Portland cement between 4% and 20% by weight of the composition, Trona between 0.5% and 4% by weight of the composition, and water between 10% and 30% by weight of the composition.

A second embodiment of the CLSM technology includes a composition for decreasing set times comprising or consisting essentially of between 10% and 50% aggregate (e.g., dry inert powders) by weight of the composition, between 30% and 70% Portland cement by weight of the composition, between 4% and 40% accelerant (e.g., Trona, sodium bicarbonate, sodium carbonate) by weight of the composition, between 25% and 50% water by weight of the composition, and between 10% and 70% air by volume of the composition. The composition may have a set time of less than 1 hour, a compressive strength of between 10 psi and 100 psi after 4 hours, and a compressive strength of between 50 psi and 1800 psi after 28 days. The composition may have a penetration resistance of between 0.5 tsf and 4.5 tsf after 4 hours.

An exemplary example of a second embodiment of the present disclosure includes a composition for decreasing set times comprising or consisting essentially of between 20% and 30% aggregate (e.g., dry inert powders) by weight of the composition, between 40% and 55% Portland cement by weight of the composition, between 10% and 25% accelerant (e.g., Trona, sodium bicarbonate, sodium carbonate) by weight of the composition, between 30% and 35% water by weight of the composition, and between 45% and 65% air by volume of the composition In an embodiment of the present disclosure, the aggregate is standard concrete grade sand, for example, sand from Austin Aggregates, 881 Hergotz Ln, Austin, Tex. 78742, or Vulcan Materials Company, 4303 N Loop 1604 E, San Antonio, Tex. 78259, or Webberville Sand & Gravel, 18601 FM 969, Manor, Tex. 78653. The aggregate may, however, be a combination of one or more of the following: sand, fine aggregate (concrete sand), coarse aggregate (rock or gravel), recycled trench spoils, or micro aggregate (e.g., rock dust, which is commonly known as Bag House Fines (BHF).)

Fine aggregate is known in the industry as concrete sand and is defined by ASTM C33 specifications. Coarse aggregate is known in the industry as rock or gravel and is also defined by ASTM C33 specifications. Recycled trench spoils refers to the material excavated to create a trench, e.g., the gravel and sand excavated from the ground to create a trench in order to place utilities into the trench prior to backfilling the trench with compositions of the present disclosure. Micro aggregate refers ultra-fine, inert or chemically active, particles that are predominantly sized less than a #200 sieve. One example of a micro aggregate is BHF, which are dust-sized micro aggregates that are typically, but not necessarily, captured in bag houses to prevent air pollution, and could be inert minerals, lime, cement kiln dust, or other chemical or mineral materials. Thus, BHF includes micro aggregates recovered via one or more of fabric filters (baghouses), electrostatic precipitators, and mechanical collectors (e.g., cyclones).

Rock dust is known in the industry as an example of BHF and is a byproduct "harvested" from a hot-mix asphalt plant when drying the moist raw aggregate materials and raising the temperature up to approximately 350-400 F, which is required to properly mix the liquid asphalt cement to make the final hot-mix asphaltic concrete for road paving.

In a first embodiment of the present disclosure, the composition has between about 50% and about 95% aggregate, between about 55% and about 90% aggregate, between about 60% and about 90% aggregate, between about 65% and about 85% aggregate, or between about 70% and 80% aggregate. In certain embodiments, a composition of the present disclosure will have less than about 95% aggregate, less than about 90% aggregate, less than about 85% aggregate, less than about 80% aggregate, less than about 75% aggregate, less than about 70% aggregate, less than about 65% aggregate, or less than about 60% aggregate. In still other embodiments, a composition of the present disclosure will have greater than about 55% aggregate, greater than about 60% aggregate, greater than about 65% aggregate, greater than about 70% aggregate, greater than about 75% aggregate, greater than about 80% aggregate, or greater than about 85% aggregate.

In a second embodiment of the present disclosure, the composition has between about 5% and about 55% aggregate, between about 10% and about 50% aggregate, between about 15% and about 45% aggregate, between about 15% and about 40% aggregate, or between about 20% and 30% aggregate. In certain embodiments, a composition of the present disclosure will have less than about 60% aggregate, less than about 55% aggregate, less than about 50% aggregate, less than about 45% aggregate, less than about 40% aggregate, less than about 35% aggregate, less than about 30% aggregate, or less than about 25% aggregate. In still other embodiments, a composition of the present disclosure will have greater than about 5% aggregate, greater than about 10% aggregate, greater than about 15% aggregate, greater than about 20% aggregate, greater than about 25% aggregate, or greater than about 30% aggregate.

In certain embodiments of the present disclosure, the aggregate will consist entirely of sand, fine aggregate, coarse aggregate, recycled trench spoils, or micro aggregates like BHFs. In other embodiments of the present disclosure, the aggregate may consist of one or more combinations of sand, fine aggregate, coarse aggregate, recycled trench spoils, or BHF in order to reach the desired specification for the composition. In still other embodiments, BHF may be added as a secondary aggregate. For example, a composition may include between 10% and 50% BHF by weight of the composition, between 20% and 30% BHF by weight of the composition.

The cementitious material of the present disclosure is standard Portland cement, which is well known in the industry. The Portland cement of the present disclosure may be Type I, Type II, Type III, Type IV, Type V, or some combination thereof. In an embodiment, the Portland cement is Type I-II. The Portland cement of the present disclosure can be obtained from a variety of sources based on economics, location, chemical properties, or additional criteria. For example, Portland cement can be obtained from CEMEX, 5134 Ute Rd, Longmont, Colo. 80503.

In a first embodiment of the present disclosure, a composition has between about 3% and about 25% Portland cement, between about 4% and about 20% Portland cement, between about 8% and about 17% Portland cement, or between about 12% and about 17% Portland cement. In some embodiments of the present disclosure, a composition has a measurable amount of, but less than about 40% Portland cement, less than about 35% Portland cement, less than about 30% Portland cement, less than about 25% Portland cement, less than about 20% Portland cement, less than about 15% Portland cement, or less than about 10% Portland cement. In additional embodiments of the present disclosure, the composition has greater than about 3% Portland cement, greater than about 4% Portland cement, greater than about 6% Portland cement, greater than about 10% Portland cement, greater than about 15% Portland cement, greater than about 20% Portland cement, greater than about 25% Portland cement, greater than about 30% Portland cement, or a greater than about 35% Portland cement.

In a second embodiment of the present disclosure, a composition has between about 25% and about 75% Portland cement, between about 30% and about 70% Portland cement, between about 35% and about 65% Portland cement, or between about 40% and about 55% Portland cement. In some embodiments of the present disclosure, a composition has a measurable amount of, but less than about 75% Portland cement, less than about 70% Portland cement, less than about 65% Portland cement, less than about 60% Portland cement, less than about 55% Portland cement, less than about 50% Portland cement, or less than about 45% Portland cement. In additional embodiments of the present disclosure, the composition has greater than about 25% Portland cement, greater than about 30% Portland cement, greater than about 35% Portland cement, greater than about 40% Portland cement, greater than about 45% Portland cement, or a greater than about 50% Portland cement.

In an embodiment of the presently disclosed compositions, the accelerant is Trona, sodium carbonate (soda ash), sodium bicarbonate (baking soda), other commercial accelerant, or some combination thereof. In certain embodiments, the accelerant is dry powder or liquid, or some combination thereof. The accelerant may be purchased from well-known commercial sources, e.g., Skyonic Corporation, 900 S. Capital of Texas Hwy., Suite 475 Austin, Tex. 78746 or Carbonfree Chemicals SPE I, LLC, 11503 Bulverde Road, San Antonio, Tex. 78217. Carbonfree Chemicals uses a process referred to as Skymine® that scrubs the $CO_2$ from a flue gas stream and precipitates sodium bicarbonate out as a product. The sodium bicarbonate used in some embodiments of the present disclosure is from the first Skymine® system installed in the United States at the Capitol Aggregates Cement plant in San Antonio, Tex. Sodium bicarbonate can also be purchased from Solvay Chemicals Inc., 3737 Buffalo Speedway, Suite 800, Houston, Tex. 77098 after being mined as Trona and refined into SBC. Trona (trisodium hydrogendicarbonate dihydrate or sodium sesquicarbonate dihydrate) is evaporate mineral. Trona is available from Solvay Chemicals Inc., 3737 Buffalo Speedway, Suite 800, Houston, Tex. 77098 and was added to compositions of the present disclosure in its raw form as SolvAir® Select 200 from Solvay Chemicals, Inc (minimum 95% purity; median diameter of particle size by laser diffraction is 35 µm with a maximum diameter of 46 µm).

The accelerant of the presently disclosed composition may vary depending on setting time and final compressive strength. In a first embodiment of the present disclosure, a composition has between about 0.25% and about 8.0% accelerant by weight of the composition, between about 0.50% and about 6%, between about 0.5% and about 4.0%, between about 0.5% and about 2%, between about 1.0% and about 4.0%, between about 1.0% and about 3.0%. In additional embodiments, a composition has greater than about 0.1% accelerant by weight of the composition, greater than about 0.2% accelerant, greater than about 0.25% accelerant, greater than about 1.0% accelerant, greater than about 2.0% accelerant, or greater than about 3.0% accelerant. In other embodiments, a composition has less than about 10% accelerant by weight of the composition, less than about 8.0% accelerant, less than about 6.0% accelerant, less than about 4.0% accelerant, less than about 2.0% accelerant, less than about 1.0% accelerant, or less than about 0.5% accelerant.

In a second embodiment of the present disclosure, a composition has between about 4% and about 40% accelerant by weight of the composition, between about 6% and about 35%, between about 8% and about 30%, or between about 10% and about 25%. In additional embodiments, a composition has greater than about 4% accelerant by weight of the composition, greater than about 8% accelerant, greater than about 10% accelerant, greater than about 15% accelerant, greater than about 20% accelerant, or greater than about 25% accelerant. In other embodiments, a composition has less than about 45% accelerant by weight of the composition, less than about 40% accelerant, less than about 35% accelerant, less than about 30% accelerant, less than about 25% accelerant, less than about 20% accelerant, or less than about 15% accelerant.

The water content of the presently disclosed compositions may vary depending on desired flowability, setting time, and final compressive strength. In an embodiment of the presently disclosed composition, the water is standard city potable water. In another embodiment, the water used in the composition is substantially purified of additional minerals or other impurities. In still another embodiment of the present disclosure, the water is non-potable water. In additional embodiments, the water is selected based on its natural impurities, e.g., specific mineral content like calcium, magnesium, iron, or similar water minerals.

In a first embodiment of the present disclosure, a composition has a water content of between about 5% and about 40%, between about 8% and about 35%, between about 10% and about 30%, between about 15% and about 25%, between about 15% and about 35%, between about 20% and about 30%. In additional embodiments, a composition has greater than about 5% water, greater than about 8% water, greater than about 10% water, greater than about 15% water, greater than about 20% water, or greater than about 25% water. In other embodiments, a composition has less than about 40% water, less than about 35% water, less than about 30% water, less than about 25% water, less than about 20% water, less than about 15% water, or less than about 10% water.

In a second embodiment of the present disclosure, a composition has a water content of between about 20% and about 50%, between about 25% and about 50%, between about 25% and about 45%, between about 25% and about 45%, or between about 30% and about 35%. In additional embodiments, a composition has greater than about 20% water, greater than about 25% water, greater than about 30% water, greater than about 35% water, or greater than about 40% water. In other embodiments, a composition has less than about 55% water, less than about 50% water, less than about 45% water, less than about 40% water, less than about 35% water, less than about 30% water, or less than about 25% water.

Any water included with additional ingredients, e.g., aqueous water retarders, foaming agents, etc. under the circumstances encountered in the field by the inventors has been negligible in comparison to the primary batch water and therefore has not been included in the above calculations. Depending on the actual water content of the additional ingredients used it may be necessary to consider the additional water in the final water concentrations.

Compositions of the present disclosure will have a range of possible set times based on the desired application. For example, when backfilling trenches in a roadway a quick set time is desired providing the set time allows sufficient time to complete filling of the void with the composition. Despite the desire for a quick set time, the ultimate final compressive strength must not exceed the local agency standards, i.e., maintain good removability modulus numbers. In some embodiments, the set time of the composition is determined by measuring penetration resistance with a pocket penetrometer (e.g., with a resistance of 4 psi as typically used in standard ASTM WK 27337) or cement setting time standard ASTM C403.

In a first embodiment of the present disclosure, the set time for a composition can be between about 8 minutes and about 120 minutes, between about 9 minutes and about 90 minutes, between about 10 minutes and about 70 minutes, between about 11 minutes and about 60 minutes, between about 12 minutes and about 50 minutes, or between about 13 minutes and about 40 minutes. In additional embodiments, a composition has a set time of less than 120 minutes, of less than about 90 minutes, of less than about 60 minutes, of less than about 45 minutes, of less than about 40 minutes, of less than about 35 minutes, of less than about 30 minutes, of less than about 25 minutes, of less than about 15 minutes. In other embodiments, a composition has a set time of greater than about 5 minutes, of greater than about 10 minutes, of greater than about 15 minutes, of greater than about 20 minutes, of greater than about 25 minutes, or of greater than about 30 minutes.

In a second embodiment of the present disclosure, the set time for a composition can be between about 5 minutes and about 60 minutes, between about 10 minutes and about 50 minutes, between about 10 minutes and about 40 minutes, between about 10 minutes and about 30 minutes, between about 5 minutes and about 40 minutes, or between about 5 minutes and about 30 minutes. In additional embodiments, a composition has a set time of less than about 70 minutes, of less than about 60 minutes, of less than about 50 minutes, of less than about 40 minutes, of less than about 30 minutes, or of less than about 20 minutes. In other embodiments, a composition has a set time of greater than about 5 minutes, of greater than about 10 minutes, of greater than about 15 minutes, of greater than about 20 minutes, of greater than about 25 minutes, or of greater than about 30 minutes.

Compositions of the present disclosure will have a range of compressive strengths at various times after the addition of a composition to a trench depending on the desired properties of the composition. For example, and similar to faster set times, a higher earlier compressive strength is advantageous when working when backfilling trenches in a roadway or other highly traveled area. The higher, earlier compressive strength allows for the backfilled void to be patched and reopened for use at an earlier time. Again, despite the desire for a high earlier compressive strength the final compressive strength must not exceed the local agency standards, i.e., maintain good removability modulus numbers.

In certain embodiments, the compressive strength is measured at 4 hours and 28 days where the 28 day measurement is considered the final compressive strength. In other embodiments, the compressive strength is measured more often at smaller intervals. In some embodiments, the compressive strength is measured at 90 days. In an embodiment, the bearing capacity or penetration resistance of a composition is measured at 1 hour, 2 hours, 4 hours, and 8 hours using ASTM WK 27337 or C403.

In a first embodiment, the compressive strength of a composition of the present disclosure as measured by ASTM D4832 at 4 hours will be between about 10 psi and about 100 psi, between about 30 psi and about 80 psi, between about 40 psi and about 70 psi. In additional embodiments, the compressive strength of the composition at 4 hours will be greater than about 20 psi, will be greater than about 30 psi, will be greater than about 40 psi, or will be greater than about 50 psi. In certain embodiments, the compressive strength of the composition at 4 hours will be less than about 100 psi, will be less than about 90 psi, will be less than about 80 psi, will be less than about 70 psi, will be less than about 60 psi, will be less than about 50 psi, will be less than about 40 psi, will be less than about 55 psi, or will be less than about 65 psi.

In a first embodiment, the compressive strength of a composition of the present disclosure at 28 days will be between about 75 psi and about 500 psi, between about 100 psi and about 400 psi, between about 125 psi and about 300 psi. In additional embodiments, the compressive strength of the composition at 28 days will be greater than about 75 psi, will be greater than about 100 psi, will be greater than about 125 psi, will be greater than about 150 psi, will be greater than about 175 psi, will be greater than about 200 psi, or will be greater than about 250 psi. In certain embodiments, the compressive strength of the composition at 28 days will be less than about 400 psi, less than about 350 psi, less than about 250 psi, less than about 200 psi, less than about 175 psi, less than about 150 psi, or less than about 125 psi.

In a second embodiment, the compressive strength of a composition of the present disclosure as measured by ASTM D4832 at 4 hours will be between about 10 psi and about 100 psi, between about 30 psi and about 80 psi, between about 40 psi and about 90 psi. In additional embodiments, the compressive strength of the composition at 4 hours will be greater than about 20 psi, will be greater than about 30 psi, will be greater than about 40 psi, or will be greater than about 50 psi. In certain embodiments, the compressive strength of the composition at 4 hours will be less than about 100 psi, will be less than about 90 psi, will be less than about 80 psi, will be less than about 70 psi, will be less than about 60 psi, will be less than about 50 psi, will be less than about 40 psi, will be less than about 55 psi, or will be less than about 65 psi.

In a second embodiment, the compressive strength of a composition of the present disclosure at 28 days will be between about 50 psi and about 1800 psi, between about 70 psi and about 1500 psi, between about 100 psi and about 1200 psi, between about 125 psi and about 1000 psi, between about 125 psi and about 800 psi, between about 125 psi and about 500 psi, between about 50 psi and about 250 psi. In additional embodiments, the compressive strength of the composition at 28 days will be greater than about 10 psi, will be greater than about 40 psi, will be greater than about 80 psi, will be greater than about 125 psi, will be greater than about 200 psi, will be greater than about 500 psi, or will be greater than about 1000 psi. In certain embodiments, the compressive strength of the composition at 28 days will be less than about 1800 psi, less than about 1500 psi, less than about 1000 psi, less than about 500 psi, less than about 300 psi, less than about 250 psi, or less than about 200 psi.

Similar to compressive strength, compositions of the present disclosure will have a range of penetration resistances at various times after mixture. For example, and similar to faster set times, a higher earlier penetration resistance is advantageous when working when backfilling trenches in a roadway or other highly traveled area. The higher, earlier penetration resistance allows for the backfilled void to be patched and reopened for use at an earlier time. Again, despite the desire for a high earlier penetration resistance the final compressive strength must not exceed the local agency standards, i.e., maintain good removability modulus numbers.

In an embodiment, the penetration resistance is measured at 2 hours and 4 hours. In a first embodiment, the penetration resistance of a composition of the present disclosure at 2 hours is between about 1.0 tsf and about 150 tsf, between about 1.5 tsf and about 125 tsf, between about 1.5 tsf and about 100 tsf, between about 1.5 tsf and about 75 tsf, between about 2.0 tsf and about 70 tsf, between about 2.5 tsf and about 70 tsf. In additional embodiments, the penetration resistance of a composition at 2 hours will be greater than about 1.0 tsf, great than about 1.5 tsf, greater than about 2.0 tsf, greater than about 5 tsf, greater than about 10 tsf, greater than about 15 tsf, greater than about 30 tsf, greater than about 50 tsf, greater than about 75 tsf, greater than about 90 tsf, greater than about 110 tsf, greater than about 120 tsf, or greater than about 130 tsf. In additional embodiments, the penetration resistance of a composition at 2 hours will be less than about 150 tsf, less than about 125 tsf, less than about 100 tsf, less than about 75 tsf, less than about 50 tsf, less than about 25 tsf, less than about 15 tsf, or less than about 10 tsf.

In a first embodiment, the penetration resistance of a composition of the present disclosure at 4 hours is between about 4 tsf and about 300 tsf, between about 4.5 tsf and about 250 tsf, between about 4.5 tsf and about 200 tsf, between about 30 tsf and about 150 tsf, between about 50 tsf and about 200 tsf, or between about 80 tsf and about 180 tsf. In additional embodiments, the penetration resistance of a composition at 4 hours will be greater than about 4 tsf, greater than about 10 tsf, greater than about 30 tsf, greater than about 40 tsf, greater than about 80 tsf, greater than about 100 tsf, greater than about 110 tsf, greater than about 120 tsf, greater than about 140 tsf, greater than about 150 tsf, greater than about 60 tsf, greater than about 160 tsf, or greater than about 170 tsf. In additional embodiments, the penetration resistance of a composition at 4 hours will be less than about 300 tsf, less than about 250 tsf, less than about 200 tsf, less than about 150 tsf, or less than about 100 tsf.

In a second embodiment, the penetration resistance of a composition of the present disclosure at 4 hours is between about 0.5 tsf and about 300 tsf, between about 0.5 tsf and about 250 tsf, between about 1.0 tsf and about 200 tsf, between about 2.0 tsf and about 150 tsf, between about 2.0 tsf and about 100 tsf, or between about 2.0 tsf and about 50 tsf, between about 2.5 tsf and about 4.5 tsf. In additional embodiments, the penetration resistance of a composition at 4 hours will be greater than about 0.5 tsf, greater than about 1.0 tsf, greater than about 1.5 tsf, greater than about 2.0 tsf, greater than about 2.5 tsf, or greater than about 3.0 tsf. In additional embodiments, the penetration resistance of a composition at 4 hours will be less than about 300 tsf, less than about 250 tsf, less than about 200 tsf, less than about 150 tsf, less than about 100 tsf, less than about 50 tsf, less than about 25 tsf, less than about 10 tsf, or less than about 4.5 tsf.

An important consideration for the disclosed compositions is the possible re-excavation of the backfilled composition by standard or ordinary excavation equipment. One measure of how easily a previously backfilled composition can be removed is the Removability Modulus ("RE"). The Removability Modulus is a commonly used industry standard for assigning a value to how easily a backfilled composition can be removed. The lower the RE number the easier the backfilled composition can be re-excavated. The Removability Modulus can be determined by the following formula:

$$RE = \frac{W^{1.5} \times 104 \times C^{0.5}}{10^6}$$

W=in-situ unit weight (pcf)
C=28 day compressive strength (psi)

In an embodiment of the present disclosure, the RE factor of a composition is between about 0.3 to about 3.5, about 1.0 and about 4.5, between about 1.2 and about 4.0, between about 1.5 and about 3.7, between about 1.7 and about 3.6, or between about 1.8 and about 3.5

In additional embodiments of the present disclosure, the RE factor of a composition less than about 5.0, less than about 4.5, less than about 4.0, less than about 3.8, less than about 3.7, less than about 3.5, less than about 3.2, less than about 3.0, or less than about 2.8. In other embodiments of the present disclosure, the RE factor of a composition is greater than about 0.3, greater than about 1.0, greater than about 1.5, greater than about 1.7, greater than about 2.0, greater than about 2.2, greater than about 2.4, or greater than about 2.5.

Some compositions of the present disclosure will include the addition of foam, e.g., the amount of air content within a composition can be controlled by varying pre-formed cellular foam, which can be optimized for the ultimate strength gain desired, the ambient temperature during the backfilling process, and the desired final properties. In specific embodiments, the air content may be achieved by adding a pre-formed cellular foam, e.g., Aerlite-ix foam liquid concentrate available from Aerix Industries, 7020 Snowdrift Road, Suite 102, Allentown, Pa. 18106 or 5916 McIntyre St, Golden, Colo. 80403. The cellular foam may be pervious or non-pervious, and pre-foamed thereby reducing or alleviating the need to vigorously agitate the composition to activate the air entraining agent. Any suitable foaming agent may be used that achieves the desired end properties as described herein, e.g., an anionic foaming agent, a cationic foaming agent or a non-ionic foaming agent. An example of a pervious foam is AQUAERiX. Examples of a non-pervious foam are Aerlite or Aerlite-ix. When water penetration is not desired, a non-pervious cellular foam is normally used. Suitable cellular foam is available from a variety of sources, e.g., Aerix industries; Provoton Foam Concrete, 28 East Larkspur Lane, Bristol, Ill. 60512; Allied Foam Tech Corp., 146 Keystone Dr. Montgomeryville, Pa. 18936; and Vermillion LLC and Associates, 2176 Sargent Daly Dr., Chattanooga, Tenn. 37421. The choice of an appropriate cellular foam is within one of skill in the art and may be dictated by cost, environmental concerns, or the need to meet the requirements of local or national agencies. In some embodiments, the foaming agent will conform to ASTM C869 and C796, in other embodiments the air entraining agent conforms to ASTM C260.

Beneficial air content in these accelerated mixtures can also be obtained with conventional air entraining admixtures (AEA) for Portland cement concrete, and generated through the mixing process. The amount of air entraining agent necessary for a given composition will vary with the desired air content, e.g., the desired final compressive strength. In some embodiments, the final air content of the composition will be between about 10% to about 70% by volume of the composition, about 15% to about 65%, about 20% to about 65%, about 25% to about 50%, about 30% to about 60%, about 35% to about 65%, or about 45% to about 65%. In some embodiments, the final air content will be less than about 70%, less than about 65%, less than about 60%, less than about 55%, less than about 50%, or less than about 45%. In some embodiments, the final air content will be greater than about 10%, greater than about 15%, greater than about 20%, greater than about 25%, greater than about 30%, greater than about 35%, greater than about 40%, or greater than about 45%.

In some embodiments, the compositions of the present disclosure may further comprise a water reducer. Water reducers may be used when a higher final strength is desired at a specified density and fluidity. Water reducers can also create more fluidity with the same water content and strength levels. In some embodiments the water reducer will be powder while in other embodiments it will be a liquid water reducer. In an embodiment, the water reducer is CHRYSO® 150 or similar composition suitable for use in the disclosed compositions. A water reducer is a chemical (e.g., chemical composition) that allows a mixture to maintain the same fluidity with less water or more fluidity with the same amount of water.

In an embodiment, the concentration of the water reducer is between about 5 and 20 fluid ounces per cubic yard of the composition, between about 9 and about 18 fluid ounces per cubic yard of the composition, or between about 11 and 16 fluid ounces per cubic yard of the composition. In certain embodiments, the concentration of the water reducer is less than 20 ounces per cubic yard of the composition, less than 18 ounces per cubic yard of the composition, less than 15 ounces per cubic yard of the composition, less than 12 ounces per cubic yard of the composition, less than 10 ounces per cubic yard of the composition, less than 7 ounces per cubic yard of the composition, or less than 5 ounces per cubic yard of the composition. In certain embodiments, the concentration of the water reducer is greater than about 2 ounces per cubic yard of the composition, greater than about 5 ounces per cubic yard of the composition, greater than about 7 ounces per cubic yard of the composition, greater than about 9 ounces per cubic yard of the composition, greater than about 11 ounces per cubic yard of the composition, greater than about 14 ounces per cubic yard of the composition, or greater than about 16 ounces per cubic yard of the composition.

In some embodiments, the compositions of the present disclosure may further comprise a polymer, e.g., hydroxypropyl methylcellulose, based on the desired properties of the compositions. The addition of a polymer or multiple polymers helps reduce water in a composition; helps achieve greater air entrainment of a composition; and helps improve suspension of sand particles (or aggregates) in the mix. All of which result in a more fluid, non-segregating, minimal bleed water mix, while using less water. In an embodiment, the concentration of the polymer is between about 0.05% and about 0.12% by weight of dry solids in the composition, between about 0.07% and about 0.10% by weight of dry solids in the composition, or between about 0.05% and about 0.10% by weight of dry solids in the composition. In certain embodiments, the concentration of the polymer is greater than about 0.05%, is greater than about 0.075%, is greater than about 0.10%, or is greater than about 0.15%. In certain embodiments, the concentration of the polymer is less than about 0.15%, is less than about 0.10%, is less than about 0.075%, or is less than about 0.05%. In some embodiments, the compositions of the present disclosure may include a dye as as a colorant.

The present disclosure also provides for a method of backfilling a trench with a disclosed composition. In one embodiment, a method of backfilling a trench with a composition comprising recycled trench spoils. For example, a method includes excavating a trench or void, maintaining some portion of the excavated trench spoils for addition to a composition, mixing a composition of the present disclosure that includes some portion of the excavated trench spoils, and filing the trench or void with the composition that includes the recycles trench spoils.

EXAMPLES

Example 1

Six embodiments of the CLSM compositions described above, all including sand as the primary aggregate, were prepared for testing and evaluation as disclosed by Table 1 and Table 2. The components for each of the six compositions is set forth below (Table 1) based on pounds per cubic yard (lb/cy) and percent (%) of the composition by weight. The cement in each composition is Portland cement from CEMEX. The water for each composition is standard tap water. The sand for each composition is from Webberville Sand & Gravel, 18601 FM 969, Manor, Tex. 78653. The Trona, used as an accelerant, is SolvAir® 200 from Solvay Chemicals Inc., 3737 Buffalo Speedway, Suite 800, Houston, Tex. 77098.

For example, looking at Table 1 and Table 2, Mix ID TR-400-25 contains 400 lbs/CY (pounds per cubic yard) of Portland cement (11.2% by weight of the composition), 2525 lbs/CY of sand (70.8% by weight of the composition), 100 lbs/CY of Trona (2.8% by weight of the composition or 25% by cement weight), and 542 lbs/CY of water (15.2% by weight of the composition). Mix ID TR-400-25 has a water to cement ratio (W/C) of 1.36, a unit weight (UW (pcf)) measured according to ASTM C138 of 131.8, and a spread measured according to ASTM D6103 of 9 inches. The compressive strength testing according to ASTM D4832 for TR-400-25 revealed 22 psi at 4 hours, 233 psi at 1 day, 458 psi at 7 days, and 687 psi at 28 days.

Notably, Trona may be used to accelerate (decrease) the set time of the disclosed compositions without resulting in a final strength (28 day compressive strength test) that hinders re-excavation at a later date. For example, Mix ID TR-400-25 uses Trona as an accelerant resulting in a compressive strength of 22 psi after only 4 hours (compare to non-accelerated Mix ID G400-AABL) but a final compressive strength of only 687 psi after 28 days.

Mix ID's are consistent throughout the Examples and descriptions of the cement, water, and additional components (e.g., SBC is sodium bicarbonate from Carbonfree Chemicals SPE I, LLC, 11503 Bulverde Rd., San Antonia, Tex. 78217) for each composition are consistent throughout the Examples unless otherwise noted. A "–" denotes no data was taken or the composition does not include that component.

TABLE 1

Compositions of the Present Disclosure that include Sand.

| Mix ID | Composition (lb./CY) | | | | | | Composition % | | | | | |
|---|---|---|---|---|---|---|---|---|---|---|---|---|
| | Cement | Sand | BHF | Trona | SBC | Water | Cement | Sand | BHF | Trona | SBC | Water |
| TR-400-25 | 400 | 2525 | 0 | 100 | 0 | 542 | 11.2 | 70.8 | 0.0 | 2.8 | 0.0 | 15.2 |
| TR-400-35 | 400 | 2465 | 0 | 140 | 0 | 542 | 11.3 | 69.5 | 0.0 | 3.9 | 0.0 | 15.3 |
| TR-500-BHF | 200 | 2265 | 500 | 50 | 0 | 542 | 5.6 | 63.7 | 14.1 | 1.4 | 0.0 | 15.2 |
| G-400-AA | 400 | 2750 | 0 | 0 | 100 | 542 | 10.5 | 72.5 | 0.0 | 0.0 | 2.6 | 14.3 |
| BHF-500 | 200 | 2250 | 500 | 0 | 50 | 542 | 5.6 | 63.5 | 14.1 | 0.0 | 1.4 | 15.3 |
| G400-AABL | 400 | 2750 | 0 | 0 | 0 | 542 | 10.8 | 74.5 | 0.0 | 0.0 | 0.0 | 14.7 |

TABLE 2

Additional Properties of Table 1 Compositions and Compressive Strength Testing of Table 1 Compositions.

| Mix ID | % trona by Cement wt. | % SBC by Cement wt. | W/C | UW (pcf) | Spread (in) | Compressive Strength (psi) | | | |
|---|---|---|---|---|---|---|---|---|---|
| | | | | | | 4 hour | 1 day | 7 day | 28 day |
| TR-400-25 | 25 | 0 | 1.36 | 131.8 | 9 | 22 | 233 | 458 | 687 |
| TR-400-35 | 35 | 0 | 1.36 | 131.8 | 8 | 43 | 207 | 391 | 587 |
| TR-500-BHF | 25 | 0 | 2.71 | 131.4 | 9 | 0 | 96 | 178 | 267 |
| G-400-AA | 0 | 25 | 1.36 | 131.6 | 11 | 46 | 130 | 193 | 258 |
| BHF-500 | 0 | 25 | 2.71 | 133.4 | 11 | 54 | 137 | 203 | 258 |
| G400-AABL | 0 | 0 | 1.36 | 133 | 9 | 0 | 350 | 895 | 1345 |

Example 2

Trona accelerated compositions can also be foamed to introduce air into the composition to decrease the final strength while maintaining a decreased set time. For example, Mix ID TR-PC-FF uses Trona to accelerate the set time of the composition, which had a compressive strength of 42 psi after 4 hours (compare to Mix ID H-55-50 and Mix ID M-55-50) but only a compressive strength of 255 psi after 28 days (compare to Mix ID H-55-50 and Mix ID M-55-50, which are foamed compositions without Trona). Thus, Trona can successfully accelerate the set times for compositions of the present disclosure while still maintaining a low final compressive strength.

TABLE 3

Compressive Strength Testing of Foamed Compositions with and without Trona as Accelerant.

| Mix ID | Composition (lb/CY) | | | | Composition (%) | | | | Foam (cf/CY) | UW (pd) | W/C | Spread (in) | Compressive Strength (psi) | | | |
|---|---|---|---|---|---|---|---|---|---|---|---|---|---|---|---|---|
| | Cement | Trona | Water | Foam | Cement | Trona | Water | Foam | | | | | 4 hour | 1 day | 7 day | 28 day |
| H-55-50 | 990 | 0 | 495 | 28 | 65.4% | 0.0% | 32.7% | 1.9% | 14 | 54.5 | 0.50 | 11 | 0 | 272 | 684 | 879 |
| M-55-50 | 990 | 0 | 495 | 28 | 65.4% | 0.0% | 32.7% | 1.9% | 14 | 55.3 | 0.50 | 11 | 0 | 199 | 591 | 892 |
| TR-PC-FF | 768 | 256 | 461 | 27.6 | 50.8% | 16.9% | 30.5% | 1.8% | 13.8 | 53.5 | 0.60 | 12 | 42 | 97 | 170 | 255 |

Example 3

Trona accelerated composition of the present disclosure (Table 4), all including sand as the primary aggregate, were compared to sodium bicarbonate accelerated compositions (Table 5) and sodium carbonate accelerated compositions (Table 6). Surprisingly, the Trona accelerated compositions, e.g., Mix ID Baseline 6 in Table 4, have a quick set time compared to the sodium bicarbonate and sodium carbonate compositions in Table 5 and Table 6 while maintaining a lower 8 hour penetration resistance.

TABLE 4

Penetration Resistance Testing of Trona Accelerated Compositions that include Sand.

| | Composition (lb/CY) | | | | % trona | | | Penetration Resistance (tsf) | | | | |
|---|---|---|---|---|---|---|---|---|---|---|---|---|
| Mix ID | Cement | Sand | Water | Trona | by cmnt | W/P | W/C | 1 hour | 2 hour | 4 hour | 6 hour | 8 hour |
| Baseline | 400 | 2650 | 542 | 0 | 0 | 1.36 | 1.36 | — | 0 | 0.5 | 4.25 | 81 |
| 1 | 400 | 2565 | 542 | 60 | 15 | 1.18 | 1.36 | 0 | 0 | 0.75 | 55 | 115 |
| 2 | 400 | 2540 | 542 | 80 | 20 | 1.13 | 1.36 | 0 | 0 | 3.75 | 121 | 156 |
| 3 | 400 | 2515 | 542 | 100 | 25 | 1.08 | 1.36 | 0 | 2.25 | 80 | 144 | 173 |
| 4 | 400 | 2490 | 542 | 120 | 30 | 1.04 | 1.36 | 0.25 | 2.75 | 106 | 158 | 207 |
| 5 | 400 | 2440 | 542 | 160 | 40 | 0.97 | 1.36 | 78 | 86 | 190 | 202 | 213 |
| 6 | 400 | 2390 | 542 | 200 | 50 | 0.90 | 1.36 | 167 | 173 | 236 | 253 | 253 |

TABLE 5

Penetration Resistance Testing of Sodium Bicarbonate Accelerated Compositions that include Sand.

| | Composition (lb/CY) | | | | % SBC By | | | Penetration Resistance (tsf) | | | | |
|---|---|---|---|---|---|---|---|---|---|---|---|---|
| Mix ID | Cement | Sand | Water | SBC | cmnt | W/P | W/C | 1 hour | 2 hour | 4 hour | 6 hour | 8 hour |
| Baseline | 400 | 2650 | 542 | 0 | 0 | 1.36 | 1.36 | — | 0 | 0.5 | 4.25 | 81 |
| 1-A | 400 | 2590 | 542 | 40 | 10 | 1.23 | 1.36 | 0.25 | 2.75 | 29 | 101 | 187 |
| 2-A | 400 | 2565 | 542 | 60 | 15 | 1.18 | 1.36 | 0.25 | 95 | 150 | 216 | 346 |
| 3-A | 400 | 2540 | 542 | 80 | 20 | 1.13 | 1.36 | 0.25 | 130 | 302 | 346 | 390 |
| 4-A | 400 | 2515 | 542 | 100 | 25 | 1.08 | 1.36 | 0.25 | 140 | 260 | 302 | 390 |

TABLE 6

Penetration Resistance Testing of Sodium Carbonate Accelerated Compositions that include Sand.

| | Composition (lb/CY) | | | | % SA by | | | Penetration Resistance (tsf) | | | | |
|---|---|---|---|---|---|---|---|---|---|---|---|---|
| Mix ID | Cement | Sand | Water | SA | cmnt | W/P | W/C | 1 hour | 2 hour | 4 hour | 6 hour | 8 hour |
| Baseline | 400 | 2650 | 542 | 0 | 0 | 1.36 | 1.36 | — | 0 | 0.5 | 4.25 | 81 |
| 1-B | 400 | 2590 | 542 | 40 | 10 | 1.23 | 1.36 | — | 57 | 132 | 210 | 274 |
| 2-B | 400 | 2565 | 542 | 60 | 15 | 1.18 | 1.36 | — | 4.5 | 187 | 256 | 311 |
| 3-B | 400 | 2540 | 542 | 80 | 20 | 1.13 | 1.36 | — | 2.75 | 216 | 360 | 388 |
| 4-B | 400 | 2515 | 542 | 100 | 25 | 1.08 | 1.36 | — | 0.75 | 167 | 239 | 274 |

Example 4

Twenty seven embodiments of the CLSM compositions described above, all without sand as an aggregate, were prepared for testing and evaluation as disclosed by Table 7. The components for each of the twenty seven compositions is set forth below (Table 7) based on pounds per cubic yard (lb/cy) and percent (%) of the composition by weight. The cement in each composition is Portland cement from CEMEX. The water for each composition is standard tap water. The Trona, used as an accelerant, is from Solvay Chemicals Inc., 3737 Buffalo Speedway, Suite 800, Houston, Tex. 77098. The C-ash is from the Drake plant, 700 Conejos Street, Colorado Springs, Colo. 80903 (Mix ID D-70 and Mix ID D-100-33) and the Nixon plant, 6598 Ray Nixon Rd., Fountain, Colo. 80817 (Mix ID N-100-33). The sodium bicarbonate (SBC), used as an accelerant, is from Carbonfree Chemicals SPE I, LLC, 11503 Bulverde Rd., San Antonia, Tex. 78217). The sodium carbonate (soda ash or SA), used as an accelerant, is from Univar USA Inc., 17425 NE Union Hill Rd., Redmond, Wash. 98052. The foam (cf/CY) is from Aerlite-ix foam liquid concentrate available from Aerix Industries, 7020 Snowdrift Road, Suite 102, Allentown, Pa. 18106.

Mix ID's are consistent throughout the Examples and descriptions of the cement, water, and additional components for each composition are consistent throughout the Examples unless otherwise noted.

TABLE 7

Compositions of the Present Disclosure that do not Contain Sand.
Compositions of Mixes Tested

| Mix ID | Composition (lb./CY) | | | | | | Water | Foam (cf/CY) | Composition % by weight | | | | | | Water | Foam % by Volume |
| --- | --- | --- | --- | --- | --- | --- | --- | --- | --- | --- | --- | --- | --- | --- | --- | --- |
| | C-Ash | Cement | BHF | Trona | SBC | SA | | | C-Ash | Cement | BHF | Trona | SBC | SA | | |
| TC-0 | — | 1657 | — | 0 | — | — | 1160 | — | — | 58.8 | — | 0.0 | — | — | 41.2 | — |
| TC-10 | — | 1583 | — | 158 | — | — | 1108 | — | — | 55.6 | — | 5.4 | — | — | 38.9 | — |
| TC-20 | — | 1515 | — | 303 | — | — | 1060 | — | — | 52.6 | — | 10.2 | — | — | 36.8 | — |
| TC-30 | — | 1453 | — | 436 | — | — | 1017 | — | — | 50.0 | — | 14.6 | — | — | 35.0 | — |
| TC-40 | — | 1396 | — | 559 | — | — | 977 | — | — | 47.6 | — | 18.5 | — | — | 33.3 | — |
| CBC-0 | — | 1002 | 1002 | 0 | — | — | 1002 | — | — | 33.3 | 33.3 | 0.0 | — | — | 33.3 | — |
| TCB-10 | — | 974 | 974 | 97 | — | — | 974 | — | — | 32.3 | 32.3 | 3.1 | — | — | 32.3 | — |
| TCB-20 | — | 948 | 948 | 190 | — | — | 948 | — | — | 31.2 | 31.2 | 6.1 | — | — | 31.2 | — |
| TCB-30 | — | 924 | 924 | 277 | — | — | 924 | — | — | 30.3 | 30.3 | 8.8 | — | — | 30.3 | — |
| TCB-40 | — | 900 | 900 | 360 | — | — | 900 | — | — | 29.4 | 29.4 | 11.4 | — | — | 29.4 | — |
| SBC-0 | — | 1657 | — | — | — | — | 1160 | — | — | 58.8 | — | — | — | — | 41.2 | — |
| SBC-10 | — | 1586 | — | — | 159 | — | 1110 | — | — | 55.6 | — | — | 5.5 | — | 38.9 | — |
| SBC-15 | — | 1553 | — | — | 233 | — | 1066 | — | — | 54.5 | — | — | 8.0 | — | 37.4 | — |
| SBC-20 | — | 1521 | — | — | 304 | — | 1064 | — | — | 52.6 | — | — | 10.3 | — | 36.8 | — |
| SA-0 | — | 1657 | — | — | — | — | 1160 | — | — | 58.8 | — | — | — | — | 41.2 | — |
| SA-10 | — | 1595 | — | — | — | 159 | 1116 | — | — | 55.6 | — | — | — | 5.5 | 38.9 | — |
| SA-15 | — | 1565 | — | — | — | 235 | 1095 | — | — | — | — | — | — | 8.0 | 37.8 | — |
| SA-20 | — | 1536 | — | — | — | 307 | 1075 | — | — | — | — | — | — | 10.4 | 36.8 | — |
| TCF-0-55 | — | 1024 | — | 0 | — | — | 461 | 14.4 | — | 69.0 | — | 0.0 | — | — | 31.0 | 53.3 |
| TCF-20-55 | — | 819 | — | 205 | — | — | 461 | 13.9 | — | 55.2 | — | 13.8 | — | — | 31.0 | 51.5 |
| TCF-30-55 | — | 717 | — | 307 | — | — | 461 | 13.6 | — | 48.3 | — | 20.7 | — | — | 31.0 | 50.4 |
| TR-PC-FF | — | 768 | — | 256 | — | — | 461 | 13.8 | — | 51.7 | — | 17.2 | — | — | 31.0 | 51.1 |
| TBF-C | — | 585 | 585 | 0 | — | — | 585 | 11.2 | — | 50.0 | 33.3 | 0.0 | — | — | 50.0 | 41.5 |
| TBF-65-40 | — | 516 | 516 | 206 | — | — | 516 | 11.5 | — | 41.7 | 29.4 | 16.6 | — | — | 41.7 | 42.6 |
| D-70 | 1560 | — | — | — | — | — | 1092 | — | 58.8 | — | — | — | — | — | 41.2 | — |
| D-100-33 | 990 | — | — | — | — | — | 495 | 12.7 | 66.7 | — | — | — | — | — | 33.3 | 47.0 |
| N-100-33 | 990 | — | — | — | — | — | 495 | 12.7 | 66.7 | — | — | — | — | — | 33.3 | 47.0 |

Example 5

The penetration resistance and compressive strength tests for Trona accelerated compositions from Table 7, with additional properties disclosed in Table 8, were evaluated as disclosed in Table 9. Mix ID D-70 is a fly ash based composition and was tested for comparison to the Trona accelerated compositions. Notably, the Trona accelerated compositions (Mix ID TC-10 to Mix ID TC-40) had quicker set times (4-hour tsf and psi) than a non-Trona accelerated composition (Mix ID TC-0) and a final lower compressive strength (28 day psi) than a non-Trona accelerated composition (Mix ID TC-0). As the amount of Trona in a composition increases, the set time decreases and the final compressive strength decreases.

TABLE 8

Trona Accelerated Composition Properties from Table 7.

| Mix ID | Composition (lb./CY) | | | % Trona by Cement | % Trona of Powder | UW (pcf) | W/P | W/C |
| --- | --- | --- | --- | --- | --- | --- | --- | --- |
| | Cement | Trona | Water | | | | | |
| TC-0 | 1657 | 0 | 1160 | 0% | 0% | — | 0.70 | 0.70 |
| TC-10 | 1583 | 158 | 1108 | 10% | 9% | 103.3 | 0.64 | 0.70 |
| TC-20 | 1515 | 303 | 1060 | 20% | 17% | 106.5 | 0.58 | 0.70 |
| TC-30 | 1453 | 436 | 1017 | 30% | 23% | 107.3 | 0.54 | 0.70 |
| TC-40 | 1396 | 559 | 977 | 40% | 29% | 108.6 | 0.50 | 0.70 |
| D-70 | 1560 | — | 1092 | — | — | 98.2 | 0.70 | 0.70 |

TABLE 9

Penetration Resistance and Compressive Strength Tests for Compositions from Table 8.

| Mix ID | Penetration Resistance (tsf) | | | | | Compressive Strengths (psi) | | | | |
| --- | --- | --- | --- | --- | --- | --- | --- | --- | --- | --- |
| | 1-hr | 2-hr | 4-hr | 6-hr | 8-hr | 4-hr | 8-hr | 1-day | 7-day | 28-day |
| TC-0 | 0 | 0 | 0 | 0 | 0.25 | 0 | 6 | 1048 | 2160 | 2883 |
| TC-10 | 0 | 0 | 18 | 46 | 104 | 33 | 723 | 1022 | 1496 | 2023 |
| TC-20 | — | 66 | 158 | 219 | 328 | 220 | 604 | 816 | 1025 | 1929 |
| TC-30 | — | 130 | 271 | 328 | 346 | 279 | 380 | 393 | 618 | 1371 |
| TC-40 | — | 377 | 389 | 389 | 389 | 411 | 436 | 526 | 665 | 1067 |
| D-70 | | | | | | 182 | 130 | 167 | 262 | 278 |

Example 6

The penetration resistance and compressive strength tests for sodium bicarbonate accelerated compositions from Table 7 were evaluated as disclosed in Table 10. Notably sodium bicarbonate accelerated compositions (Mix ID SBC-10 to SBC-20) had quicker set times (4-hour tsf and psi) than a non-sodium bicarbonate accelerated composition (Mix ID SBC-0) and a final lower compressive strength (28 day psi) than a non-sodium bicarbonate accelerated composition (Mix ID SBC-0). As the amount of sodium bicarbonate in a composition increases, the set time decreases and the final compressive strength decreases.

TABLE 10

Penetration Resistance and Compressive Strength Tests for Sodium Bicarbonate Accelerated Compositions from Table 7.

| Mix ID | % SBC by cmt. Wt. | w/c | Penetration Resistance (tsf) | | | | Compressive Strength (psi) | | | | |
|---|---|---|---|---|---|---|---|---|---|---|---|
| | | | 2-hr | 4-hr | 6-hr | 8-hr | 4-hr | 8-hr | 1-day | 7-day | 28-day |
| SBC-0 | 0 | 0.7 | 0 | 0 | 0 | 0.25 | 0 | 6 | 1048 | 2160 | 2883 |
| SBC-10 | 10 | 0.7 | 1 | 3.5 | 75 | 144 | 49 | 620 | 1150 | 1528 | 1859 |
| SBC-15 | 15 | 0.7 | 66 | 132 | 228 | 253 | 194 | 325 | 651 | 1022 | 1430 |
| SBC-20 | 20 | 0.7 | 0.5 | 3 | 150 | 210 | 92 | 292 | 377 | 520 | 794 |

Example 7

The penetration resistance and compressive strength tests for sodium carbonate accelerated compositions from Table 7 were evaluated as disclosed in Table 11. Notably sodium carbonate accelerated compositions (Mix ID SA-10 to SA-20) had quicker set times (4-hour tsf and psi) than a non-sodium carbonate accelerated composition (Mix ID SA-0) and a final lower compressive strength (28 day psi) than a non-sodium carbonate accelerated composition (Mix ID SA-0). As the amount of sodium carbonate in a composition increases, the set time decreases and the final compressive strength decreases.

TABLE 11

Penetration Resistance and Compressive Strength Tests for Sodium Carbonate Accelerated Compositions from Table 7.

| Mix ID | % SA by cmt. Wt. | w/c | Penetration Resistance (tsf) | | | | Compressive Strength (psi) | | | | |
|---|---|---|---|---|---|---|---|---|---|---|---|
| | | | 2-hr | 4-hr | 6-hr | 8-hr | 4-hr | 8-hr | 1-day | 7-day | 28-day |
| SA-0 | 0 | 0.7 | 0 | 0 | 0 | 0.25 | 0 | 6 | 1048 | 2160 | 2883 |
| SA-10 | 10 | 0.7 | 3.75 | 144 | 388 | — | 377 | 759 | 875 | 1274 | 1655 |
| SA-15 | 15 | 0.7 | 115 | 202 | 388 | — | 294 | 443 | 520 | 866 | 1369 |
| SA-20 | 20 | 0.7 | 86 | 216 | 311 | — | 203 | 262 | 337 | 574 | 960 |

Example 8

The compressive strength tests for Trona accelerated compositions from Table 7 that include Bag House Fines (BHF) as an inert filler, with additional properties disclosed in Table 12, were evaluated as disclosed in Table 13. Notably, Trona accelerated compositions (Mix ID TCB-10 to TCB-20) had quicker set times (4-hour psi) than a non-Trona accelerated composition (Mix ID CBC-0) and a final lower compressive strength (28 day psi) than a non-Trona accelerated composition (Mix ID CBC-0). As the amount of Trona in a composition increases, the set time decreases and the final compressive strength decreases.

TABLE 12

Trona Accelerated Composition Properties from Table 7.

| | Composition (lb./CY) | | | | % Trona by | % Trona of | | | |
|---|---|---|---|---|---|---|---|---|---|
| Mix ID | Cement | BHF | Trona | Water | Cement | Powder | UW (pcf) | W/P | W/C |
| CBC-0 | 1002 | 1002 | 0 | 1002 | 0% | 0% | 111.3 | 0.50 | 1.00 |
| TCB-10 | 974 | 974 | 97 | 974 | 10% | 5% | 111.2 | 0.48 | 1.00 |
| TCB-20 | 948 | 948 | 190 | 948 | 20% | 9% | 111.4 | 0.45 | 1.00 |
| TCB-30 | 924 | 924 | 277 | 924 | 30% | 13% | 113.5 | 0.43 | 1.00 |
| TCB-40 | 900 | 900 | 360 | 900 | 40% | 17% | 114.7 | 0.42 | 1.00 |

TABLE 13

Compressive Strength Tests for Compositions from Table 12.

| | Compressive Strengths (psi) | | | | |
|---|---|---|---|---|---|
| Mix ID | 4-hour | 8-hour | 1-day | 7-day | 28-day |
| CBC-0 | 0 | 11 | 840 | 1522 | 2041 |
| TCB-10 | 12 | 132 | 642 | — | 1220 |
| TCB-20 | 89 | 523 | 863 | — | 1435 |
| TCB-30 | 157 | 415 | 623 | — | 1201 |
| TCB-40 | 349 | 428 | 468 | — | 967 |

Example 9

The compressive strength tests for Trona accelerated and foamed compositions from Table 7, with additional properties disclosed in Table 14, were evaluated as disclosed in Table 15. Notably, Trona accelerated and foamed compositions (Mix ID TCF-20-55 to TR-PC-FF) had quicker set times (4-hour psi) than a non-Trona accelerated and foamed composition (Mix ID TCF-0-55) and a final lower compressive strength (28 day psi) than a non-Trona accelerated and foamed composition (Mix ID TCF-0-55). As the amount of Trona in a composition increases, the set time decreases and the final compressive strength decreases.

TABLE 14

Trona Accelerated Composition Properties from Table 7.

| | Composition (lb./CY) | | | Foam | % Trona by | % Trona of | | | | Spread |
|---|---|---|---|---|---|---|---|---|---|---|
| Mix ID | Cement | Trona | Water | (cf/CY) | Cement | Powder | UW (pcf) | W/P | W/C | (in) |
| TCF-0-55 | 1024 | 0 | 461 | 14.4 | 0% | 0% | 54.8 | 0.45 | 0.45 | 9 |
| TCF-20-55 | 819 | 205 | 461 | 13.9 | 25% | 20% | 54.7 | 0.45 | 0.56 | 13 |
| TCF-30-55 | 717 | 307 | 461 | 13.6 | 43% | 30% | 54.6 | 0.45 | 0.64 | 14 |
| TR-PC-FF | 768 | 256 | 461 | 13.8 | 33% | 25% | 53.6 | 0.45 | 0.60 | 12 |

TABLE 15

Compressive Strength Tests for Compositions from Table 14.

| | Compressive Strengths (psi) | | | | |
|---|---|---|---|---|---|
| Mix ID | 4-hour | 8-hour | 1-day | 7-day | 28-day |
| TCF-0-55 | 0 | 4 | 373 | 587 | 689 |
| TCF-20-55 | 16 | 36 | 107 | 140 | 187 |
| TCF-30-55 | 93 | 103 | 128 | 171 | 238 |
| TR-PC-FF | 41 | — | 96 | 160 | 233 |

Example 10

The compressive strength tests for Trona accelerated and foamed compositions from Table 7 that include Bag House Fines (BHF) as an inert filler, with additional properties disclosed in Table 16, were evaluated as disclosed in Table 17. Notably, a Trona accelerated and foamed composition with Bag House Fines (Mix ID TBF-65-40) had a quicker set time (4-hour psi) than a non-Trona accelerated and foamed composition (Mix ID TBF-C) and a final lower compressive strength (28 day psi) than a non-Trona accelerated and foamed composition (Mix ID TBF-C). As the amount of Trona in a composition increases, the set time decreases and the final compressive strength decreases.

TABLE 16

Trona Accelerated Composition Properties from Table 7.

| | Composition (lb./CY) | | | | Foam | % Trona by | % trona by | | | |
|---|---|---|---|---|---|---|---|---|---|---|
| Mix ID | Cement | BHF | Trona | Water | (cf/CY) | Cement | powder | UW (pcf) | W/P | W/C |
| TBF-C | 585 | 585 | 0 | 585 | 11.2 | 0% | 0% | 62.6 | 0.50 | 1.00 |
| TBF-65-40 | 516 | 516 | 206 | 516 | 11.5 | 40% | 20% | 63 | 0.42 | 1.00 |

TABLE 17

Compressive Strength Tests for Compositions from Table 16.

| | Compressive Strengths (psi) | | | | |
|---|---|---|---|---|---|
| Mix ID | 4-hour | 1-day | 7-day | 28-day | RE |
| TBF-C | 0 | 82 | 270 | 400 | 1.03 |
| TBF-65-40 | 33 | 70 | 101 | 152 | 0.64 |

Example 11

The compressive strength tests for certain compositions from Table 7 are compared in Table 18. Mix ID D-100-33 and Mix ID N-100-33 are fly ash compositions (Composite is an average of both fly ash compositions). Mix ID TR-PC-FF, Mix ID TCF-30-55, and Mix ID TBF-65-40 are Trona accelerated cement compositions. Mix ID TCF-0-55 and Mix ID TBF-C are non-accelerated cement composition. Notably, Trona accelerated compositions behave similarly to fly ash compositions and represent a alternative solution to current uses for fly ash compositions.

TABLE 18

Comparison of Compressive Strength Testing for Select Compositions from Table 7.

| | | Spread | Compressive Strength (psi) | | | | | |
|---|---|---|---|---|---|---|---|---|
| Mix ID | UW (pcf) | (in) | 4-hour | 8-hour | 1-day | 7-day | 28-day | RE |
| D-100-33 | 55 | 18 | 100 | — | 145 | 199 | 276 | 0.70 |
| N-100-33 | 55 | 16 | 58 | — | 89 | 101 | 145 | 0.51 |
| Composite | 55 | — | 79 | — | 117 | 150 | 211 | 0.62 |
| TR-PC-FF | 55 | 12 | 42 | — | 97 | 170 | 234 | 0.65 |
| TCF-30-55 | 55 | 14 | 93 | 103 | 128 | 171 | 238 | 0.65 |
| TBF-65-40 | 65 | — | 33 | — | 70 | 101 | 152 | 0.67 |
| TCF-0-55 | 55 | 9 | 0 | 4 | 373 | 587 | 689 | 1.11 |
| TBF-C | 65 | — | 0 | — | 82 | 270 | 400 | 1.09 |

What is claimed is:

1. A composition using Trona for accelerating set times of the composition comprising:
   between 60% and 90% aggregate by weight of the composition, the percent aggregate by weight of the composition does not include Trona;
   between 3% and 25% Portland cement by weight of the composition;
   between 0.25% and 8% Trona by weight of the composition; and
   between 8% and 35% water by weight of the composition;
   the composition having a time to set of less than 1 hour, a compressive strength of between 10 psi and 100 psi after 4 hours, a compressive strength of between 75 psi and 600 psi after 28 days, and a penetration resistance of between 4.5 tsf and 200 tsf after 4 hours.

2. The composition of claim 1, wherein the aggregate is between 65% and 85% by weight of the composition.

3. The composition of claim 1, wherein the aggregate is fine aggregate.

4. The composition of claim 1, wherein the aggregate is a combination of coarse aggregate and fine aggregate.

5. The composition of claim 1, wherein the aggregate is a combination of fine aggregate and micro aggregate.

6. The composition of claim 5, wherein the micro aggregate is dust that is collected in the baghouses of asphalt plants, cement plants, or other industrial facilities that generate and collect dust.

7. The composition of claim 1, wherein the aggregate is sand.

8. The composition of claim 1, wherein the aggregate is a combination of coarse aggregate and sand.

9. The composition of claim 1, wherein the Portland cement is between 4% and 20% by weight of the composition.

10. The composition of claim 1, wherein the Trona is between 0.5% and 4% by weight of the composition.

11. The composition of claim 1, wherein the water is between 10% and 30% by weight of the composition.

12. The composition of claim 1, wherein the aggregate is sand between 65% and 85% by weight of the composition;
   the Portland cement is between 4% and 20% by weight of the composition;
   the Trona between 0.5% and 4% by weight of the composition; and
   the water is between 10% and 30% by weight of the composition.

13. The composition of claim 1, wherein the penetration resistance at 4 hours is between 80 tsf and 180 tsf.

14. The composition of claim 1 or 12 further comprising micro aggregate between 5% and 80% by weight of the composition.

15. The composition of claim 14, wherein the micro aggregate is between 15% and 30% by weight of the composition.

16. The composition of claim 1 or 12 further comprising a water reducer between 9 and 18 fluid ounces per cubic yard of the composition.

17. The composition of claim 1 or 12 further comprising a polymer.

18. The composition of claim 17, wherein the polymer is between 0.05% and 0.12% by weight of dry solids in the composition.

19. The composition of claim 18, wherein the polymer is hydroxypropyl methylcellulose.

20. A composition using Trona for accelerating set times consisting essentially of:
- between 60% and 90% aggregate by weight of the composition, the percent aggregate by weight of the composition does not include Trona;
- between 3% and 25% Portland cement by weight of the composition;
- between 0.25% and 8% Trona by weight of the composition; and
- between 8% and 35% water by weight of the composition; the composition having a time to set of less than 1 hour, a compressive strength of between 10 psi and 100 psi after 4 hours, a compressive strength of between 75 psi and 600 psi after 28 days, and a penetration resistance of between 4.5 tsf and 200 tsf after 4 hours.

\* \* \* \* \*